Oct. 2, 1956           R. D. SIMMONS           2,764,989
MANICURE CUTICLE STICK
Filed June 29, 1953
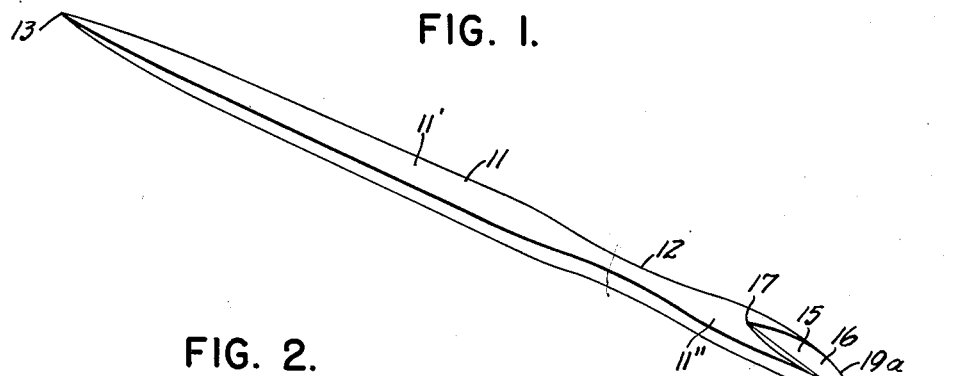
FIG. 1.
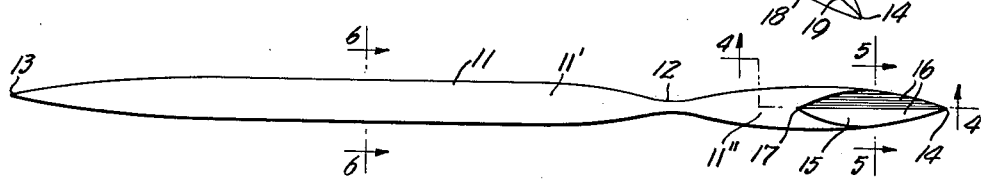
FIG. 2.
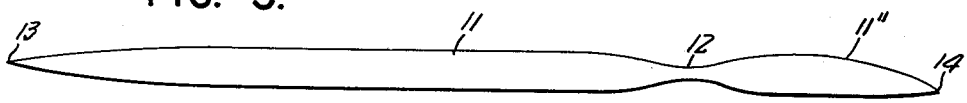
FIG. 3.
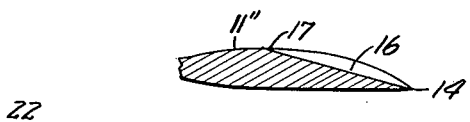
FIG. 4.     FIG. 5.     FIG. 6.
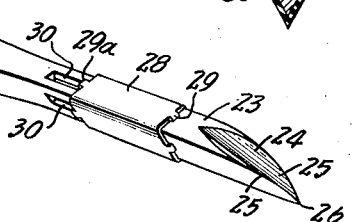
FIG. 7.     FIG. 9
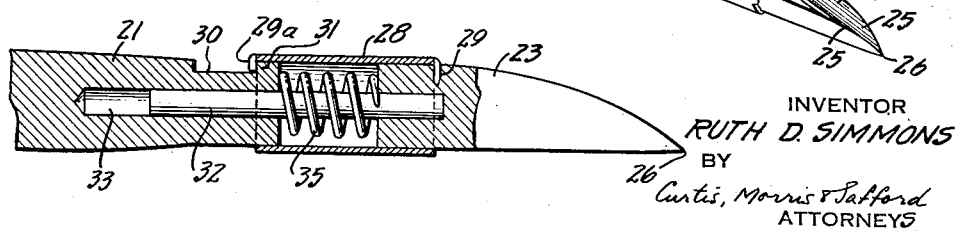
FIG. 8.
INVENTOR
RUTH D. SIMMONS
BY
Curtis, Morris & Safford
ATTORNEYS

United States Patent Office 2,764,989
Patented Oct. 2, 1956

2,764,989

MANICURE CUTICLE STICK

Ruth D. Simmons, New York, N. Y.

Application June 29, 1953, Serial No. 364,559

12 Claims. (Cl. 132—75.3)

This invention relates to manicure sticks adapted for use in treating cuticles and for cleaning nails. More particularly, the invention relates to improved types of manicure sticks which are simple and efficient in the use thereof.

Before describing the various embodiments of my invention, it is to be understood that the recitation of specific details of various embodiments is generally intended to be illustrative of the features of the invention and not limiting thereof, the limits of the invention being defined in the appended claims.

Perhaps the features of the invention can best be described by reference to the accompanying drawings wherein:

Fig. 1 is a perspective view of a manicure cuticle stick embodying one form of the invention.

Fig. 2 is a plan view of the cuticle stick shown in Fig. 1.

Fig. 3 is a side view of the cuticle stick of Fig. 1.

Fig. 4 is a fragmentary sectional view taken along the lines 4—4 of Fig. 2.

Fig. 5 is a cross sectional view taken along the lines 5—5 of Fig. 2.

Fig. 6 is a cross sectional view taken along the lines 6—6 of Fig. 2.

Fig. 7 is a perspective view of another manicure stick embodying the invention.

Fig. 8 is a broken-away partial sectional view of one end of the stick shown in Fig. 7.

Fig. 9 is a cross sectional view similar to that of Fig. 6 but showing the manicure stick provided with a resilient coating.

Referring more particularly to Figs. 1–6 of the drawing there is shown a manicure cuticle stick 11 which is generally triangular in cross-section (see Fig. 6) and which may be made of various materials. For example, the stick 11 may be made of wood, metal, somewhat stiff plastic materials such as vinyl polymers, methyl methacrylate polymers, phenol-formaldehyde polymers and the like and may also be provided with a resilient coating such as a layer of soft rubber 36 as shown in Fig. 9. Stick 11 is elongated and tapers to a point 13 which may advantageously be used for removing dirt from under the fingernails and the other end of stick 11 also tapers to a point 14 which is the apex of a curvilinear groove 15. Between the center of the stick 11 and the groove 15, there is a narrower tapered portion 12 for the more ready accommodation of the users' fingers.

Referring more particularly to Fig. 3 it will be seen that the end of stick 11 which is remote from point 13 tapers smoothly on two sides to a point 14 and that the top face or surface 11" of the triangular cross-secional body is formed as a gradually curved convex surface extending longitudinally back from the point or sharp tip 14. Groove 15 is defined by two flat side walls 16 at which converge at their inner end as shown at 17 and converge and merge at their outer end to form the sharp end or tip 14, thereby providing a single sharp point and relatively sharp edges at 18, 19 and 19a, which edges are advantageous in pressing the cuticle back towards the main body of the finger. The user thus has a wide variety of choice on the one end of stick 11 for various shapes of edges to be used in pushing back the cuticle. For example, the edge 18 is straight and the edges 19 and 19a are curvilinear, tapering to the sharp point or tip 14. Moreover, due to the generally triangular shape of the main body of the stick 11, a given edge 18, 19 and 19a uniformly becomes blunter as one proceeds further towards the axial center of stick 11.

Referring now to Figs. 7 and 8 there is shown another embodiment of my invention wherein main stick 20 which is generally triangular in cross section is provided with a main body 21 and a grooved end member 23. The end 22 tapers to a point similar to the end 13 of Figs. 1 through 3. The main body 21 of stick 20 is provided with a central slot 33 which is adapted to slidably receive a dowel pin 32 which is firmly attached to the grooved end member 23 as by cementing. Also attached and fitting over the inner portion of grooved end member 23 is a rigid ferrule member 28 which is provided with stop members 29 and 29a at the ends thereof. Ferrule 28 may be made of wood, metal, plastic or the like. Each stop member 29 is imbedded in the grooved end member 23 thereby securely fastening ferrule member 28 to said grooved member. Main body member 21 is provided with slots 30 which slidably receive stop member 29a. A compression spring 35 surrounds dowel pin 32 and is positioned inside ferrule 28. Grooved end member 23 is provided with a slot 25 having side walls 24 which taper to point 26 similar to that described in connection with Figs. 1 through 3. In using stick 20, the grooved end member 23 is movable with respect to main body member 21 being urged outwardly by the action of compression spring 35, and being restrained by the abutment of stop members 29a against stops 31.

Having now described my invention what I claim is:

1. A cuticle stick which comprises an elongated body member of rigid material, said body member being generally triangular in cross-section, said body member being provided with a plurality of slots cut into the outer side walls thereof, a cooperating grooved end member which is also generally triangular in cross-section, said grooved end member being provided with a longitudinal groove having flat walls which extend to a point and thereby provide tapered side edges, said grooved member being partially enclosed within a ferrule which is attached to said grooved member, said ferrule being provided with stop members which slidably engage said slots of said main body member, a compression spring positioned within said ferrule and adapted to urge said grooved member away from said main body member, and a dowel pin secured to said grooved member and positioned to lie within said ferrule member and to slidably engage a longitudinal slot in said main body member.

2. A cuticle stick according to claim 1 wherein said ferrule is also provided with at least one stop member which engages a groove on the outer wall of said main body member and is adapted to abut against the ends of said slot.

3. A cuticle stick according to claim 1 wherein said body member is covered with soft rubber.

4. A cuticle stick which comprises an elongated body member of rigid material, said body member being generally triangular in cross-section, said body member being provided with a plurality of slots cut into the outer side walls thereof, a cooperating grooved end member which is also generally triangular in cross-section, said grooved end member being partially enclosed within a ferrule which is attached to said grooved member, said ferrule being provided with stop members which slidably engage said slots of said main body member, and a compression spring positioned within said ferrule and adapted to urge said grooved member away from said main body member.

5. A cuticle stick according to claim 4 wherein said body member and said cooperating grooved end member are covered with a soft resilient coating.

6. A cuticle stick according to claim 4 wherein said ferrule is also provided with at least one stop member which engages a groove on the outer wall of said main body member and is adapted to abut against the ends of said slot.

7. A cuticle stick according to claim 6 wherein said body member and said cooperating grooved end member are covered with a soft resilient coating.

8. A cuticle stick which comprises an elongated rigid body member of generally triangular cross-section towards one end, said body member tapering smoothly to a grooved end portion which terminates in a short tip at said one end, said one end having one face of said triangular cross sectional body portion formed as a gradually curved convex surface extending longitudinally back from said sharp tip and having two flat converging inner walls cut into said curved convex surface and the body to form said grooved end portion thereby forming opposite edges of the grooved end portion of gradual curvilinear tapering form to provide a plurality of different curved edge portions along said opposite edges to be used in pushing back cuticles, said two converging inner walls merging into a common point at said one end to form the sharp tip at said one end.

9. A cuticle stick according to claim 8 wherein said body member is provided with a smoothly constricted portion between the longitudinal center of the body member and said grooved end portion.

10. A cuticle stick which comprises an elongated rigid body member being generally triangular in cross-section, said body member tapering smoothly to a point at one end thereof and said body member also tapering smoothly to a grooved end portion which terminates in a sharp tip at the other end thereof, said other end having one face of said triangular cross sectional body formed as a gradual curved convex surface extending longitudinally back from said sharp tip and having two flat converging inner walls cut into said curved convex surface and the body to form said grooved end portion thereby forming opposite edges of the grooved end of gradual curvilinear tapering form to provide a plurality of different curved edge portions along said opposite edges to be used in pushing back cuticles, said two converging inner walls merging into a common point at said one end to form the sharp tip at said one end.

11. A cuticle stick according to claim 10 wherein said body member is provided with a smoothly constricted portion between the longitudinal center of the body member and said grooved end portion.

12. A cuticle stick which comprises an elongated rigid body member of generally triangular cross section towards one end, one face of said body member adjacent said end tapering gradually to the end and terminating in a sharp tip, said one face having two flat converging inner walls cut therein, each wall forming a tapering edge with each adjacent other face of said body member, said two flat converging inner walls merging into a common point at said one end to form a sharp tip at said one end.

References Cited in the file of this patent

UNITED STATES PATENTS

| | | |
|---|---|---|
| 1,367,974 | Ivory | Feb. 8, 1921 |
| 1,746,591 | Heymann et al. | Feb. 11, 1930 |
| 2,192,733 | Bader | Mar. 5, 1940 |
| 2,437,834 | Peritz | Mar. 16, 1948 |
| 2,480,446 | Carlson | Aug. 30, 1949 |